United States Patent
Ortiz et al.

(10) Patent No.: US 8,791,586 B2
(45) Date of Patent: *Jul. 29, 2014

(54) FLUID DRIVEN ELECTRIC POWER GENERATION SYSTEM

(75) Inventors: Luis M. Ortiz, Albuquerque, NM (US); Anthony Michael Baca, Albuquerque, NM (US); Donald Wichers, Albuquerque, NM (US)

(73) Assignee: MDL Enterprises, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/197,411

(22) Filed: Aug. 3, 2011

(65) Prior Publication Data

US 2011/0285134 A1    Nov. 24, 2011

Related U.S. Application Data

(60) Division of application No. 12/127,508, filed on May 27, 2008, now Pat. No. 8,067,852, which is a continuation-in-part of application No. 12/058,764, filed on Mar. 31, 2008, now Pat. No. 7,868,476.

(60) Provisional application No. 60/921,331, filed on Mar. 31, 2007, provisional application No. 60/953,106, filed on Jul. 31, 2007.

(51) Int. Cl.
*F03D 9/00* (2006.01)

(52) U.S. Cl.
USPC ............................................. 290/54; 290/55

(58) Field of Classification Search
USPC ........................................ 290/43, 44, 54, 55
See application file for complete search history.

(56) References Cited

U.S. PATENT DOCUMENTS

| | | | |
|---|---|---|---|
| 4,176,283 A | 11/1979 | McLaren | |
| 5,167,483 A | 12/1992 | Gardiner | |
| 7,663,261 B2 | 2/2010 | Miller et al. | |
| 7,868,476 B2 * | 1/2011 | Baca et al. | 290/55 |
| 8,067,852 B2 * | 11/2011 | Ortiz et al. | 290/55 |
| 8,143,737 B2 * | 3/2012 | Ortiz et al. | 290/54 |
| 8,362,635 B2 * | 1/2013 | Ortiz et al. | 290/55 |

* cited by examiner

Primary Examiner — Nicholas Ponomarenko

(57) ABSTRACT

A tubular housing can include at least one fixed helical vane formed onto the inner surfaces of the tubular housing in a spiral and adapted to direct fluid into a spiraled flow and focus fluid onto a fan blade assembly associated with an alternator system and located within the tubular housing before a system exhaust. A generator cone can be mounted near the center and front of the fan blade assembly facing fluid passing through the tubular housing. As fluid passes over the generator cone it experiences compression between the generator cone and housing resulting in increased pressure and velocity of the fluid, thereby increasing rotational speed of the generator blades and generator as the compressed, spiraled fluid passes through the blades and exits the tubular housing. The system can be used for fixed or mobile applications in water, wind and manually induced fluid flow.

22 Claims, 15 Drawing Sheets

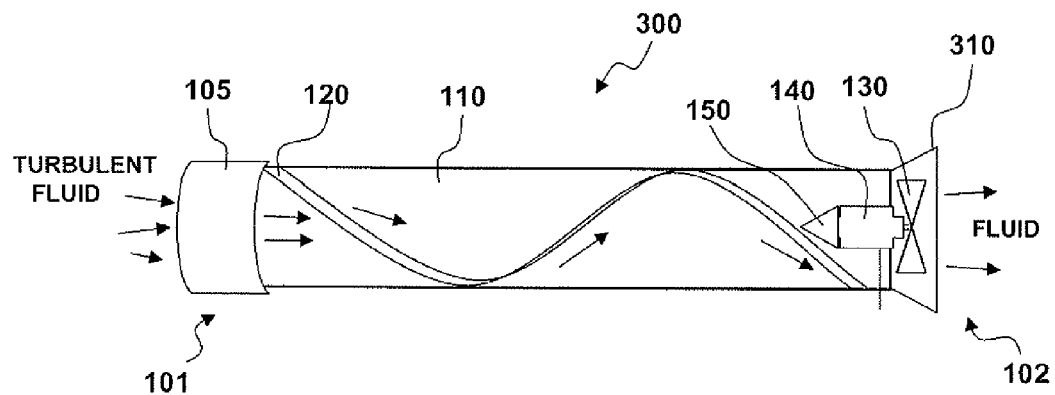
FIG. 8
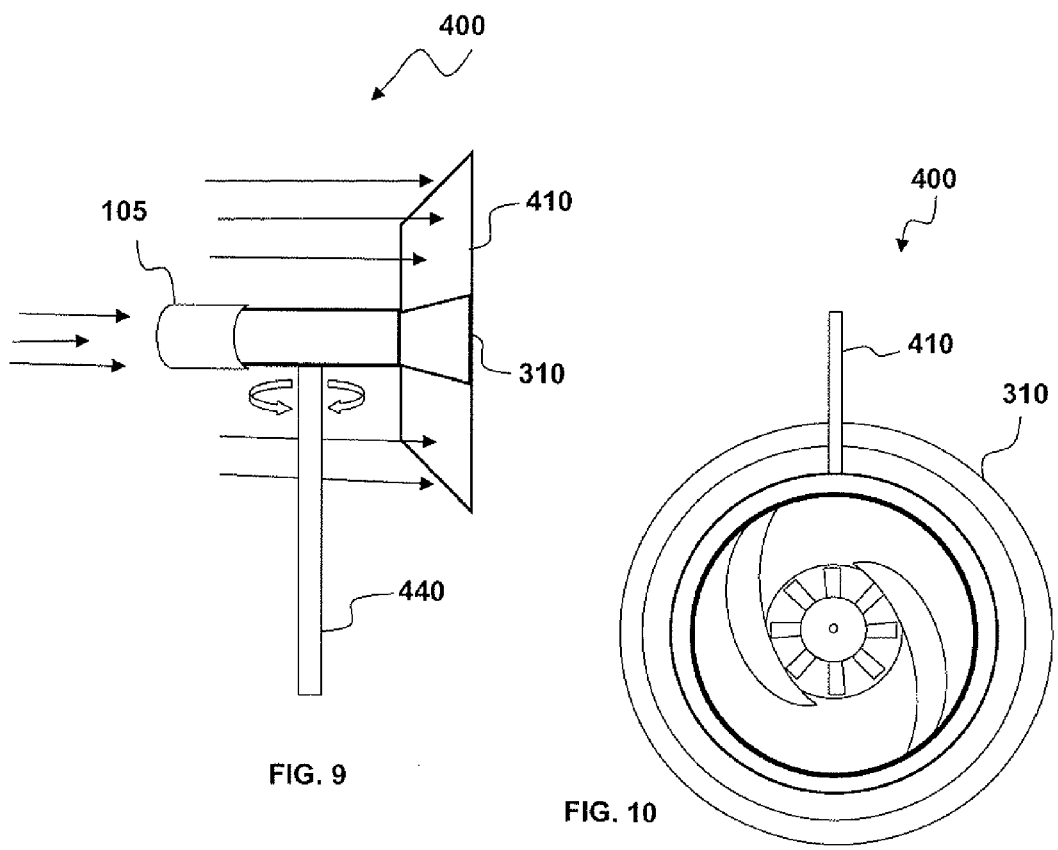
FIG. 9
FIG. 10

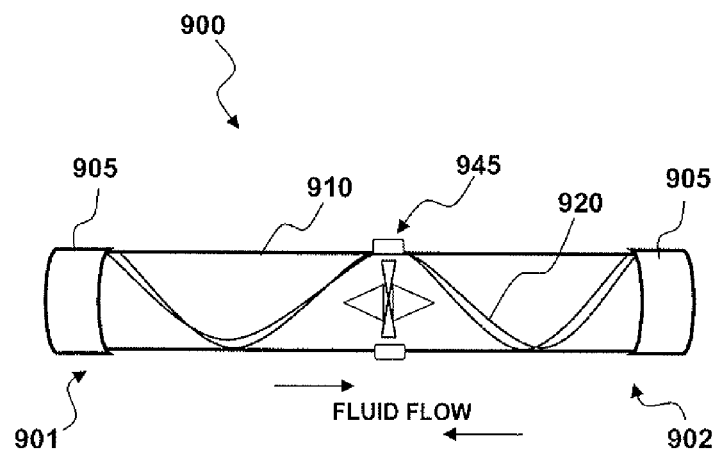
FIG. 15
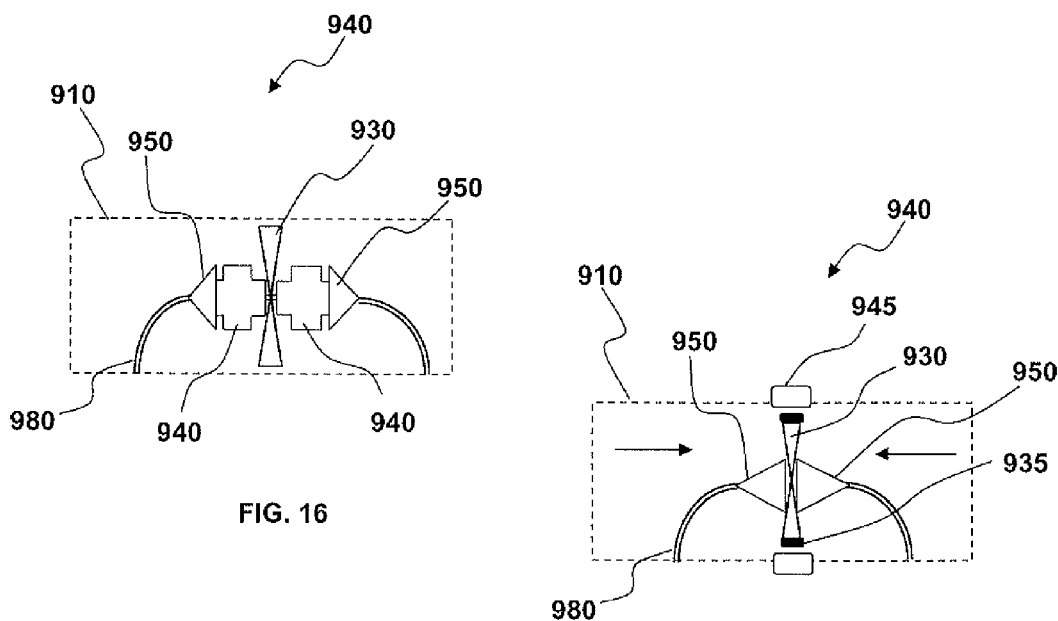
FIG. 16
FIG. 17

FLUID DRIVEN ELECTRIC POWER GENERATION SYSTEM

This application claims priority as a divisional application to non-provisional patent application Ser. No. 12/127,508, filed May 27, 2008, now U.S. Pat. No. 8,067,852, entitled "FLUID DRIVEN ELECTRIC POWER GENERATION SYSTEM," which is a continuation-in-part of non-provisional patent application Ser. No. 12/058,764, filed Mar. 31, 2008, issued as U.S. Pat. No. 7,868,476, entitled "WIND-DRIVEN ELECTRIC POWER GENERATION SYSTEM", which claims priority to provisional patent application 60/921,331, filed Mar. 31, 2007 and to provisional patent application 60/953,106,filed Jul. 31, 2007, all herein incorporated by reference herein.

TECHNICAL FIELD

The present invention is generally related to renewable energy systems. More particularly, the present invention is related to fluid powered generator systems adapted for fixed and mobile electrical power generation systems and applications.

BACKGROUND OF THE INVENTION

Wind and stream or oceanographic water are forces of nature in the form of fluid that surround us and as a whole is barely being tapped for its energy generating potential. Wind is harnessed by sail ships, pump water, and create electricity, just to name a few. Hydroelectric power has also contributed largely to the production of electricity. Hydroelectric systems have also typically deployed as large industrial system and have not found wide use in the private sector. Yet untapped potential exists with streams and shorelines near residential and commercial developments.

Recent events in the world have highlighted the need for alternative, cleaner methods of power production, whether it is from the wind, the sun, water, or organic matter. Changes in battery storage capacity and life and generator efficiency have made it so that individuals desiring to supplement their energy requirements may do so at a much more affordable cost over 15 years ago. These so-called "Green" technologies continue to be improved as energy shortages and high costs of energy plague society.

In general, electric power generation systems can be classified into hydroelectric power generation, thermal power generation, nuclear power generation, solar power generation, bio-fuel power generation, and wind power generation using wind energy. Wind energy is limitless, purely domestic renewable energy that is freely available in the world. The wind power generation system faces some difficulty in its stability due to fluctuation in direction and speed of air. Wind energy has been used as a source of power for sailing ships for several thousands of years, and until recently, we have been using it in water pumping and operating flour mills. Recently, many new ideas and theories for windmill and wind power generation have surfaced, like propeller shaped blades as part of large, scaled power generators that rotate based on aerodynamics of the blade designs.

Wind generated power has been used as a source of electricity that can be used directly by buildings and other fixed infrastructure, or has been fed directly into public utility system grids for distribution and use by public utility customers. Wind generated electrical power will continue to find uses as its need increases at all levels and types of consumption and as an alternative energy to fossil fuels.

It is known in the art that the propeller of a wind power generator should ideally be positioned in the path of the flowing air. In most systems currently being deployed internationally, propellers and generators can reach height greater than 100 feet and rotational diameters greater than 50 ft. Propellers currently used with wind power generators are designed in such a way to produce power output as various wind speed conditions press against propeller blades. It is unfortunate that such system must be so large, which is a main point of contention by many communities.

Systems for the generation of electrical power from natural sources are clearly needed that are smaller than is currently available and in wide use. There is also more specifically a need for smaller, less visually intrusive fluid powered electric generation systems for fixed residential, commercial, and mobile applications. With the current invention a system is presented that can less expensively generate electrical energy from fluid flow, be it air or water. Power generated by the present invention can be utilized in fixed as well as mobile applications and can generate electrical power from wind, vehicle-induced airflow, flowing water in a stream or river, flowing water through water utility lines, and ocean flow near coastlines.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore an objective of the present invention to provide an improved fluid powered electric power generating system. Fluid flow as used herein includes power harnessed from airflow caused by wind and hydraulic power caused from stream and ocean water movement.

It is another objective of the present invention to provide a fluid driven electric power generator system useful for static and mobile applications. Static application can include residential and commercial building applications whether above ground, associated with public and private water utilities, or within a body of water. Mobile applications include automotive, marine, air, and any commercial/industrial freight or human transportation systems.

A new alternator in one embodiment of the present invention includes a generally radial shape and includes a winding portion integrated on/within a tubular housing adapted to carry fluid there through, and an integrated fan rotor portion rotationally operable within the electromagnetic field of a fixed winding portion associated with a tubular housing. The winding portion can include coil windings formed from flat conductor material and emplaced around a core of magnetic flux conducting material. The integrated fan rotor portion includes permanent magnets attached to a rim formed on the outer circumference of fan blades extending from a center rotor. Rotation of the magnets disposed on the outer perimeter of the fan blades as fluid passes through the tubular housing and the fan blades of the integrated fan rotor portion produces magnetic fields on the winding portion that remains stationary because the winding portion can be integrated with the tubular housing.

Another benefit of the alternator of this embodiment is in its potentially low manufacturing cost. The conductor coils can be located on or integrated within the tubular housing peripherally to a magnetic field emitting rotor upon final assembly. The manufacturing reproducibility of the design of the radial, slotless alternator is therefore less expensive and more practical for enable fluid flow there through in accordance with the present invention. Although the radial, slotless alternator can be incorporated into working embodiments of the present invention, other alternator designs can still operate well within fluid power generating systems described herein without limitation.

In accordance with a feature of the present invention, a system generating electrical power from fluid can include a cowling located at a first end of a tubular housing to capture fluid and can direct it into the tubular housing.

In accordance with yet another feature of the present invention, at least one fixed helical vane can be integrated into the inner surface of the tubular housing in a spiral, adapted to further direct fluid captured in the housing into a spiraled fluid flow and more directly focus the fluid's energy onto fan blades associated with an electrical alternator located at or near the end of the at least one fixed helical vane. A second end of the tubular housing can enable fluid to be exhausted from the tubular housing once it has passed through fan blades associated with the electrical alternator.

In accordance with another feature of the present invention, a conical flange can be formed at the second end of the unit, said conical flange adapted to protect the fan blades and also enables fluid to escape from the unit without interruption from exterior wind source moving along the sides of the unit. The conical flange can also assist in the orientation of the first end of the system in the directions of incoming fluid.

In accordance with another feature of the present invention, a cone can be mounted at the center and front of the alternator within the circumference of the fan blades, facing approaching fluid passing through the tubular housing. As fluid passes over the generator cone it can experience compression between the generator cone and housing resulting in increased pressure and velocity of the fluid as it passes through the fan blades, thereby increasing rotational speed of the fan blades and alternator as the compressed air passes through the blades.

In accordance with a feature application of the present invention, the system can be mounted at or integrated within the front of a moving vehicle for mobile applications. Mounting of the unit to the bow of a boat, the front of a cargo container, or integrated it within the front of an automobile, can facilitate the generation of electricity for various uses such as recharging of battery supplies, providing power to mobile refrigeration units, providing power to mobile vehicle electrical components, etc. When the system can be integrated near or at the front of a moving vehicle, it can capture airflow as the vehicle moves forward, thereby generating electrical power from airflow for charging a load, such as hybrid vehicle batteries, which can assist in extending the operation range of an electric vehicle.

In accordance with yet another feature application of the present invention, the system can be submersed into flowing water, such as within a stream, river or along a shoreline of an ocean. Fluid in the form of water flowing through the housing can facilitate the generation of electricity for various uses such as recharging of battery supplies, transferring power into an electrical power grid, providing power to electrical components in the field, providing electrical power to mobile and stationary loads such as appliances, etc.

In accordance with yet another feature application of the present invention, the system can be installed along piping associated with municipal and private water distribution systems to facilitate the generation of electricity for various uses such as: recharging of battery supplies for remote power uses, for transferring power into an electrical power grid, OF providing power to electrical components in the field (e.g., street lights), etc.

In accordance with another feature application of the present invention, the system can be rotatably mounted on top of a pole for fixed residential used, remote telecommunications equipment power, power grid distribution, or fixed commercial applications. Mounting of the unit to poles, towers, rooftops, beams and other fixed hardware can be facilitated with bearing and mounts that can withstand extreme fluctuations and high stress.

In accordance with another feature of the present invention, electrical contact discs (plates) can be provided that facilitate electrical connections between the generator and external modules (e.g., batteries, converters, etc.) and prevent wire tangling. Sealed electrical contact discs can be integrated with the bearing and mounting mechanism adapted to rotatably mount the housing to a pole.

In accordance with another feature of the present invention, a fin can be provided in fixed attachment to a second end of the power generating system near the second end of the tubular housing to direct the front of the tubular housing into approaching fluid by rotating the housing on a pole, thereby enabling the system to receive the maximum amount of available wind into the system.

In accordance with another feature of the present invention, power conditioning can be provided to generated power if necessary using conditioning circuits known in the art (e.g., filtering circuits). The size of the present system is scalable to meet delivery requirements.

In accordance with another feature of the present invention, the housing can be made of a tough light weight metal or a composite that will be able to withstand harsh environments while meeting the highest of standards.

In accordance with another feature of the present invention, a cowling can be located at the front of the alternator/fan with its point facing incoming fluid to cause the fluid to flow directly onto fan blades and not encounter a flat surface typically associated with the back of a alternator or center portion of a fan wherefrom blades extend. Pressure caused between the inner surface of the housing tubing and the cone/generator can force fluid directly onto the alternator fan blades and outward past the fan blades where the fluid can be exhausted from the second end of the housing.

In accordance with another feature of the present invention, a cupped fan blade can be included to enhance the effect of fluid pressure on the fan blades and ultimately as rotation of the alternator.

In accordance with another feature of the present invention, a clutching mechanism and/or mechanical breakaway can be provided to accommodate conditions where the wind speed exceeds rotational capabilities of the alternator and/or power output requirements/thresholds. Clutching can be provided in the form of a fan blade assembly designed with materials that can flex above threshold rotational speeds (RPMs) in order to prevent operation of the generator above damage causing thresholds, design parameters and generator capacity limits.

In accordance with another feature of the present invention, an electronic starting circuit can be provided in order to facilitate initial starting of a traditional alternator from periods when the alternator is idle (e.g., no rotation due to lack of fluid). The electronic starting system can provide an initial release of electrical energy to the windings in the generator to thereby reduce the amount of fluid required to spin-up or start rotation of the generator.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 8 illustrates a side view of fluid driven electrical power generating system including a conical flange located near the second end of the system with fluid directing the cowling located at the first end of the tubular housing into oncoming fluid flow, in accordance with features of the present invention;

FIG. 9 illustrates a side view of an air driven electrical power generating system rotationally mounted on a pole and including a fin to oriented the front end of the power generating system into oncoming wind, in accordance with features of the present invention;

FIG. 10 illustrates a view of the first end of the fluid driven electrical power generating system such as that shown in FIG. 9, similar looking to the generator with a cowling shown in FIG. 7, but including a fin and conical flange located near the second end of the system, in accordance with features of the present invention;

FIG. 15 is side view illustration of a fluid driven electrical power generating system adapted for bi-directional fluid flow and including a cowling at each end of the housing, in accordance with features of the present invention;

FIG. 16 is a side cross sectional perspective view of a bi-directional power generation system, in accordance with features of the present invention;

FIG. 17 is a side cross sectional perspective view of an alternate bi-directional power generation system utilizing a slotless integrated fan alternator wherein the outer circumference of the fan includes magnets that cause electromagnetic energy to be experienced by wiring formed in a core form on/outside of the tubular housing, in accordance with features of the present invention;

DETAILED DESCRIPTION

The particular values and configurations discussed in these non-limiting examples can be varied and are cited merely to illustrate at least one embodiment and are not intended to limit the scope thereof.

"Fan" or "fan blade" are commonly used in association with wind or airflow but as referred to herein should also be interpreted to include the meaning associated with "propeller" or "propeller blades" which are terms commonly used when referring to water flow as a fluid medium.

"Alternator" as used herein should also be interpreted to include "generator" as a means for producing electrical energy.

"Fluid" as used herein should be interpreted to include wind, airflow caused by forward motion of a vehicle, water flow caused by a stream or river, water flow as found within water distribution piping for commercial and private entities, and water flow as caused by the ocean.

Figure 1:
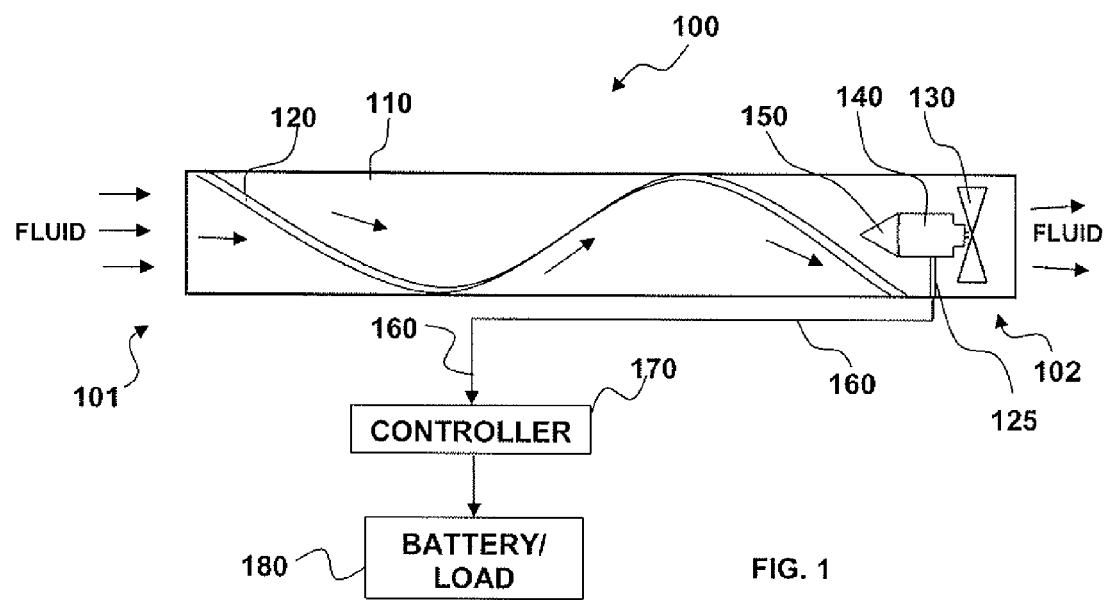
FIG. 1 illustrates a block diagram of a fluid driven electrical power generating system, which can be implemented in accordance with features of the present invention.

FIG. 1 illustrates a block diagram of a wind driven electrical power generating system 100, which can be implemented in accordance with a preferred embodiment. The system 100 can include a tubular housing 110 having a first end 101 and a second end 102 including at least one helical vane 120 formed therein which can cause fluid entering the first end 101 and flowing through the tubular housing to spiral as it approaches an integrated fan rotor assembly 130 mechanically or electromagnetically connected to an electric alternator 140 located near the second end 102, wherein electrical power can be generated as the fan 130 turns the electric alternator 140. A cone 150 can also be provided in front of the fan 130 and/or electrical alternator 140. The cone 150 can be placed in front of the generator 140 if the generator can be placed before and connected to the fan 130, or the cone 150 can be placed before the flat center portion of the fan 130, which are the central structural areas that are generally known to generally support fan blades extending there from. It can be appreciated that the alternator 140 and any electrical wiring 160 associated therewith can be protected within the tubular housing 110 when main components of the alternator can be placed before the fan. The electrical power from the electrical generator 140 can be routed via electrical connection 160 for immediate use by a load 180 (e.g., storage and later use in/from batteries, transfer to electric power grids, direct use by electric components) or can first pass through a controller 170 for power management.

Fixed helices 120 formed on surfaces of a tubular housing 110 and within the tubular housing 110 as depicted in FIG. 1 can increase fluid flow as well as creating a spiral laminar air flow, thus avoiding turbulent air flow. Enhanced spiraled flow causes efficient spinning of fan blades 130 at an accelerated speed, thereby increasing rotational speed of a generator 140 installed within the system 100 for optimal power output with minimal velocity or fluid speed conditions external to the system. Fixed helical vanes 120 are ideally designed to achieve the direction of incoming fluid into a spiraled air flow. Fixed helices 120 within the enclosure tube can increase fluid flow as well as creating a spiraled air flow. In application where a cowling can be used at the intake, the cowling can create a laminar fluid flow prior to a spiraling effect placed on fluid by the helical vanes 120. Based on enclosure shape and design, the helical vanes 120 can conform to a concave inner surface of the tubular housing 110 enclosure inner surface while insuring the optimal three-dimensional helix angles. The vanes 120 can direct and increase the spiral rotation and velocity of the fluid, thus more efficiently spinning the fan blade 130 thereby increasing rotational efficiency of any generator used therein for optimal power output.

Figure 2:
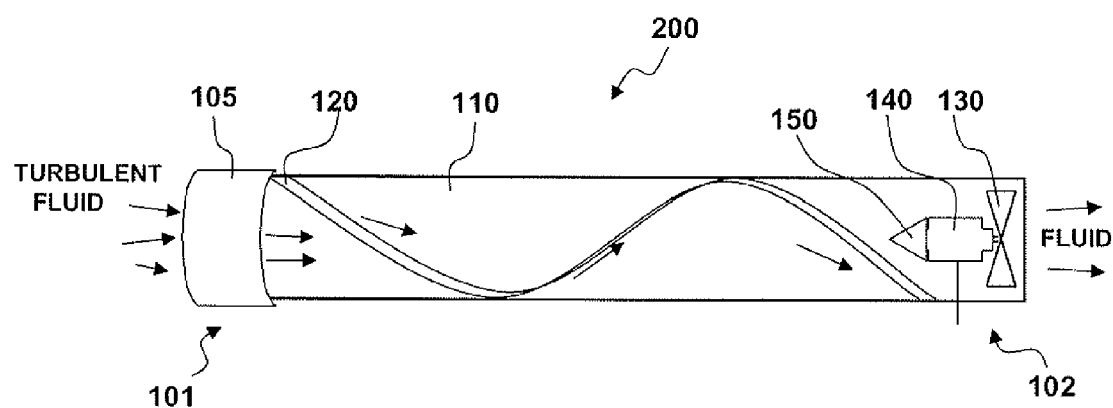
FIG. 2 illustrates a block diagram of a fluid driven electrical power generating system including a cowling used with turbulent incoming fluid, which can be implemented in accordance with features of the present invention.

Referring to FIG. 2, illustrated is a block diagram of a fluid driven electrical power generating system 200 such as that generally shown in FIG. 1, but including a cowling 105 that can be located at the first end 101 of the tubular housing 110 for some applications wherein fluid (i.e., wind or ocean current must be captured and managed). The cowling 105 enables the receipt of fluid into the tubular housing 110 and the straightening of fluid into laminar flow as it passes the cowling 105 and enters the tubular housing 110. The cowling 105 can be effective in capturing fluid and taming turbulent fluid flow, which is typically encountered with wind and ocean current.

Figure 3:
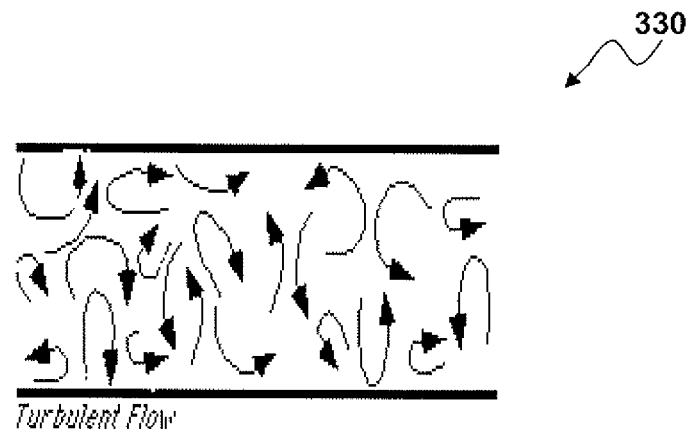
FIG. 3 illustrates a turbulent flow of air flowing through a tubular housing without a cowling.

FIG. 3 illustrates a turbulent flow 330 of wind inside a clear passage tube. Air flow occurs only when there is a difference between pressures. Air will generally flow from a region of high pressure to one of low pressure. Typically; the bigger the presser difference, the faster the flow. When aft flows at higher velocities, especially through an airway with irregular walls, flow is generally disorganized, even chaotic, and tends to form eddies. A relatively large driving pressure is typically required to sustain turbulent flow. Driving pressure during turbulent flow is believed proportional to the square of the flow rate such that to double the flow rate one must quadruple the driving pressure, which is touched on by the following equation:

Turbulent flow can be described by Poiseuille's Law:
$$\Delta P = KV^2$$

wherein $\Delta P$=Driving force,
K=Constant, and
V=Air flow.

Figure 4:
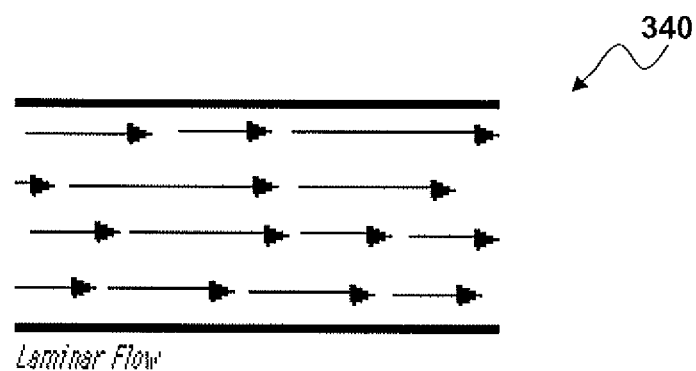
FIG. 4 illustrates a laminar flow of air flowing through a tubular housing of wind driven electrical power generating system using a cowling to capture wind and direct it into the housing, which can be implemented in accordance with a preferred embodiment.

FIG. 4 illustrates a laminar flow 340 of a wind inside passage tube. When flow is of a relatively low velocity and passes through narrow tubes, it tends to be more orderly and streamlined and can flow in a straighter path. This type of flow is called laminar flow. Unlike turbulent flow, laminar flow is directly proportional to the driving pressure, such that to double the flow rate, one needs only double the driving pressure, as generally shown by the following equation:

Laminar flow can be described by Poiseuille's Law
$$\Delta P = V(8 \eta l/\pi r^4)$$

wherein $\Delta P$=Difference in pressure between two points,
V=Air flow,
R=Radius of passage tube,
$\eta$=Gas Velocity, and
l=length of the tube.

Figure 5:
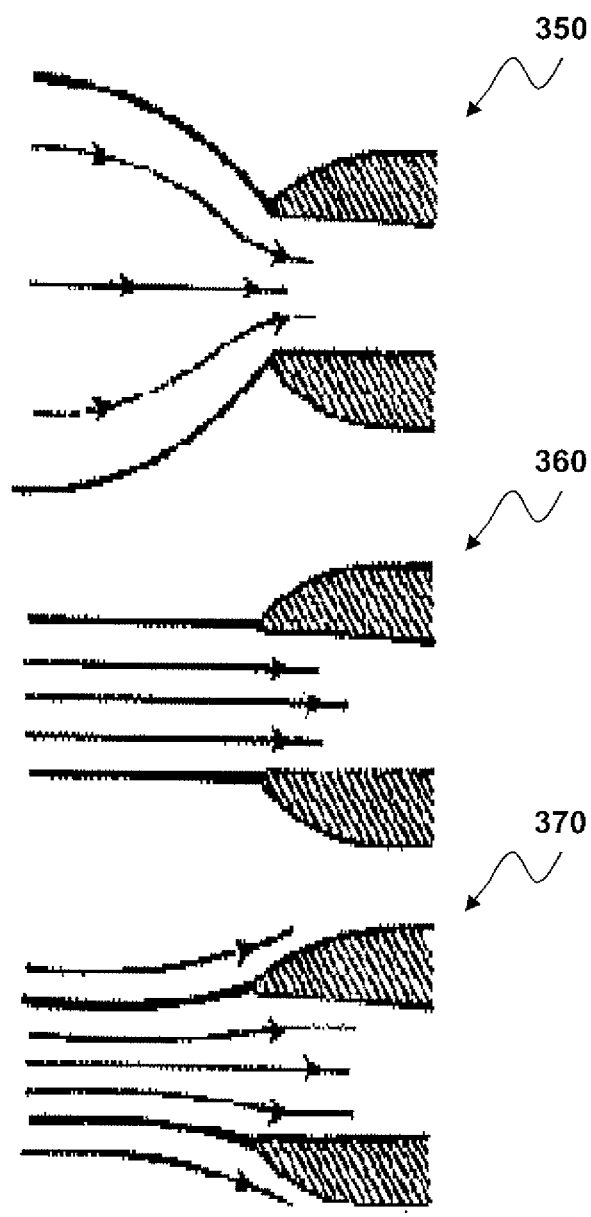
FIG. 5 illustrates three phenomena that can occur with wind directed toward a cowling, a cowling design of a wind driven electrical power generating system, which can be implemented in accordance with a preferred embodiment.

It has become important in the field of fluid dynamics to control turbulent flow and enable the efficient capture of a fluid. FIG. 5 illustrates a cowling design 350, 360, 370, and various airflow phenomena. The design of the conical inlet (a tube with an aerodynamic fairing around it) or conical air intake in the shape of a cowling as illustrated helps to direct air into housing. When used in the present invention, the inlet can be ideally designed to draw in as much wind coming toward it as possible to cause favorable power generation by the system 100 as depicted in FIG. 2, especially when used in combination with at least one fixed helical vane 120 as depicted in FIG. 2 and fan blade assembly 130 as depicted in FIG. 2.

Figure 6:
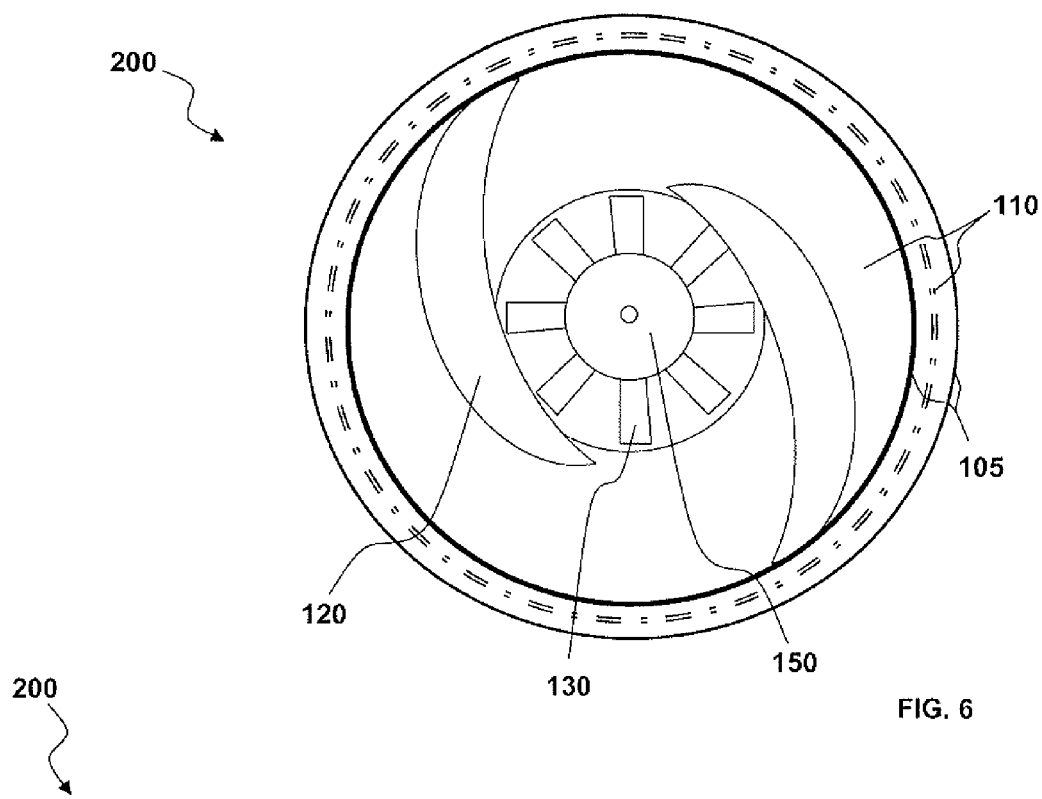
FIG. 6 illustrates a view of the first end of the fluid driven electrical power generating system looking into the cowling or coupling (depending if application is using a cowling with turbulent fluid or a coupling spliced into a water distribution system) through the inside of the tubular housing past helical vanes towards the fan, in accordance with features of the present invention.

Referring to FIG. 6, a view from the first end of the fluid driven electrical power generating system 200 looking into the housing is shown outlined 110 past a cowling 105 (or coupling, depending if application is using a cowling with turbulent fluid or a coupling spliced into a water distribution system). Inside of the tubular housing 110 are helical vanes 120 fixed on the inner surface of the housing 110 and spiraling towards a fan 130 and cone 150, in accordance with features of the present invention.

Figure 7:
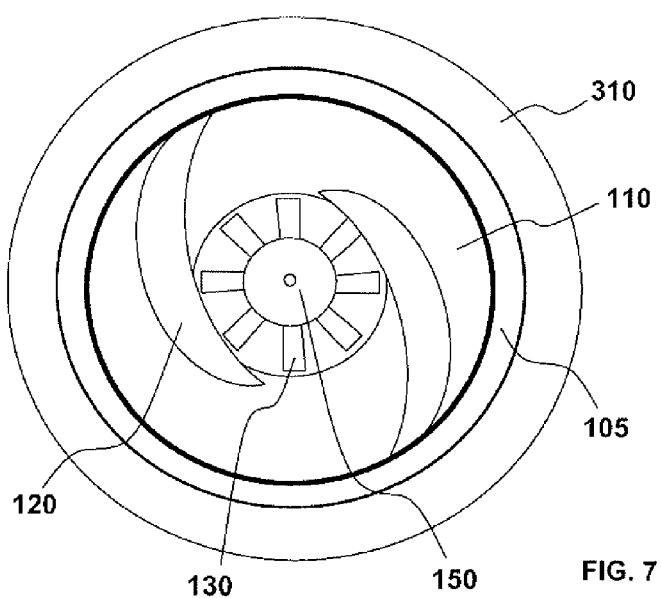
FIG. 7 illustrates a view of the first end of the fluid driven electrical power generating system such as that shown in FIG. 6, including a cowling/coupling located at the first end of the system, in accordance with features of the present invention.

FIG. 7 illustrates another view of a fluid driven electrical power generating system 300 from the first end of the system, in accordance with features of the present invention. The system 300 includes a cowling 105 located at the first end and also an exhaust 310 located at the second end of the system. The exhaust 310 can be provided in the form of a conical flange.

Referring to FIG. 8, a side view of an exhaust 310 can be designed at a wider, tapered outward diameter than the air passage tubing 110 in order to allow air flowing through the air passage to easily escape the system around cone 150 and generator 140, thus also aiding in the removal of heat produced in/by the generator during the production of electrical power.

Referring to FIG. 9, a side view of a wind power electric generation system 400 is illustrated. The wind power electric generation system 400 includes a cowling 105 at the intake, a conical flange shaped exhaust 310, a fin 410 used to orient the front of the system 400, and cowling 105, into approaching wind. The wind power electric generation system can be rotatable mounted onto a pole 400, which can be provided at various lengths depending on the systems application and surrounding environmental conditions.

FIG. 10 illustrates a side view of a wind driven electrical power generating system 400 in FIG. 9 from the first end of the system. In accordance with features of the present invention, the system 400 includes a fin 410 for orienting the system into oncoming wind. Also shown is an exhaust 310 which can be provided in the form of a conical flange.

Figure 11:
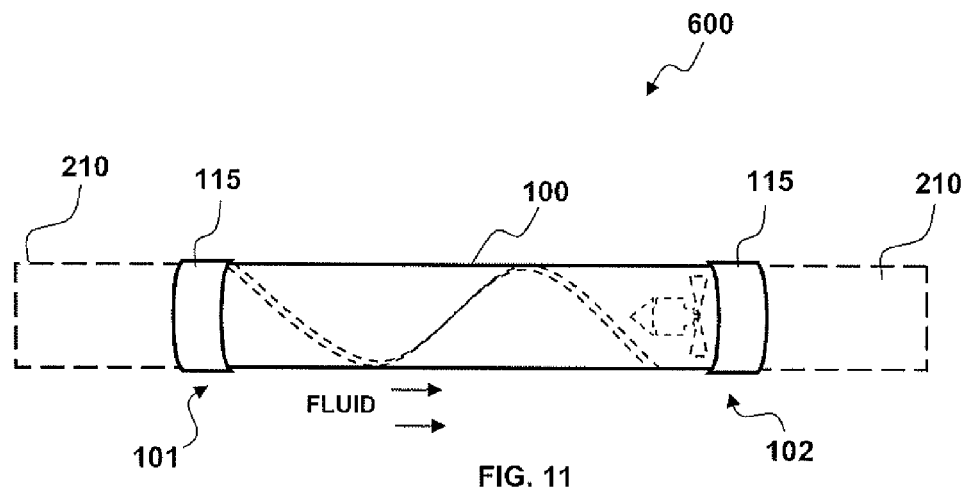
FIG. 11 is an illustration of a water utility line fluid driven electrical power generating system including line couplings for securing the power generator inline within a water distribution system, which can be implemented in accordance with features of the present invention.

FIG. 11 illustrates a side view of a schematic diagram of a fluid driven electrical power generating system 600, which can be installed for use with water distribution lines 210, in accordance with features of the present invention. The system shown in FIG. 1 can be used herein with the addition of couplings 115 at the first end 101 and second end 102 of the housing 110 to connect the system 600 in line with water distribution lines 210 as part of a water distribution system, such a public water utilities.

Figure 12:
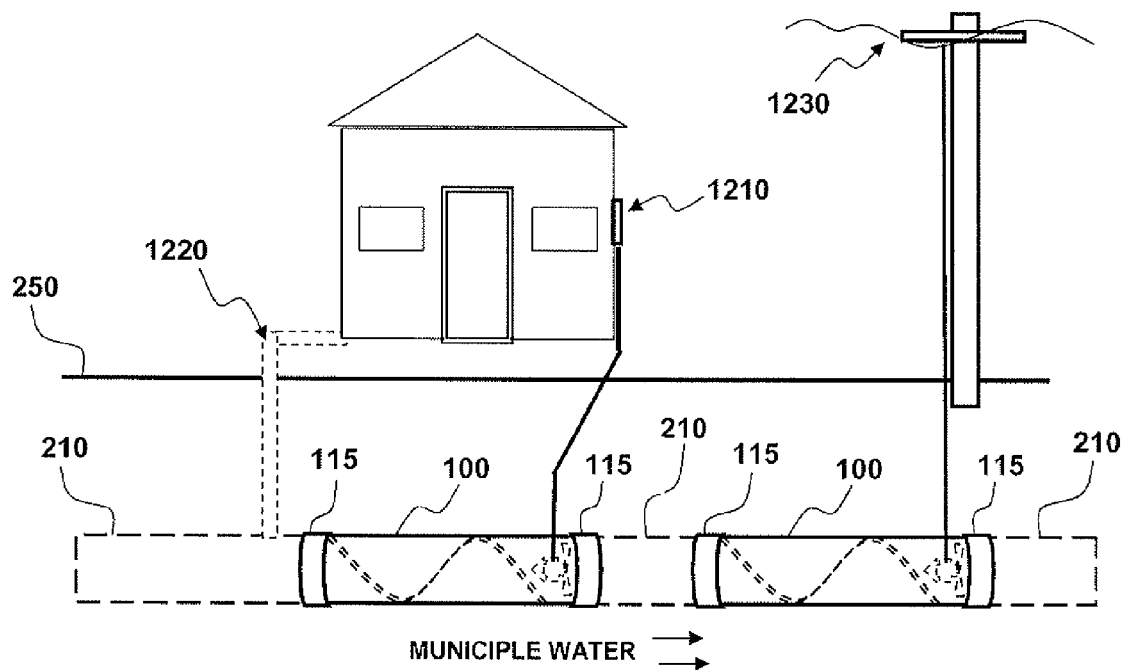
FIG. 12 is a schematic representation of applications for a water utility line application for the fluid driven electrical power generating system of the present invention.

Referring to FIG. 12, fluid driven electrical power generating systems 100 are shown installed under ground level 100 as part of a water distribution system. Couplings 115 located at each end of the system 100 are used to connect them in line with piping 210 for water distribution systems. Piping 210 is typically tapped by smaller water pipes 1220 for delivery through meters (not shown) to residences or business. This same water distribution system can be a source of energy that remains largely untapped for electrical power and can easily be tapped for delivery of electricity to electrical distribution system 1210 associated with homes as shown in FIG. 12, or for distribution of electricity into public electrical utility lines 1230 by municipalities, also shown in FIG. 12. With such a system, municipalities can generate additional revenue using water distribution systems deployed or planned for deployment underneath and throughout a city.

Figure 13:
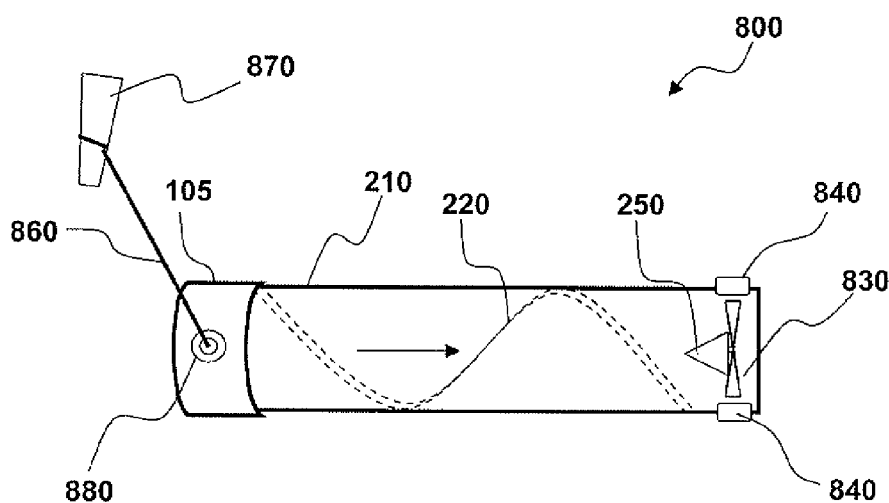
FIG. 13 is side view illustration of a fluid driven electrical power generating system including an electric line and land tether, in accordance with features of the present invention.

FIG. 13 illustrates a side view of a schematic diagram of a fluid driven electrical power generating system 800, which can be placed within a natural stream or river for use to generate electrical power for use remotely (e.g., when camping), in accordance with features of the present invention. The fluid driven electrical power generating system 800 shown in FIG. 13 is meant to be portable for easy deployment within the field. The housing 210 can include a cowling 105 at its fluid intake and an electrical alternator at its exhaust. The alternator shown in FIG. 13 can be a slotless integrated fan alternator described in more detail below in FIGS. 21-23. Although other alternators/generators can be used, a slotless integrated fan alternator can be more efficient as the outer circumference of the fan includes magnets that cause electromagnetic energy to be experienced by wiring formed around a core that can be fixed to the housing of the system 800 or outside of the tubular housing. The housing can be made of various materials including plastic, stainless steel, and aluminum. It can be appreciated that the housing can also be designed to be collapsible, thereby providing additional portability.

Figure 14:
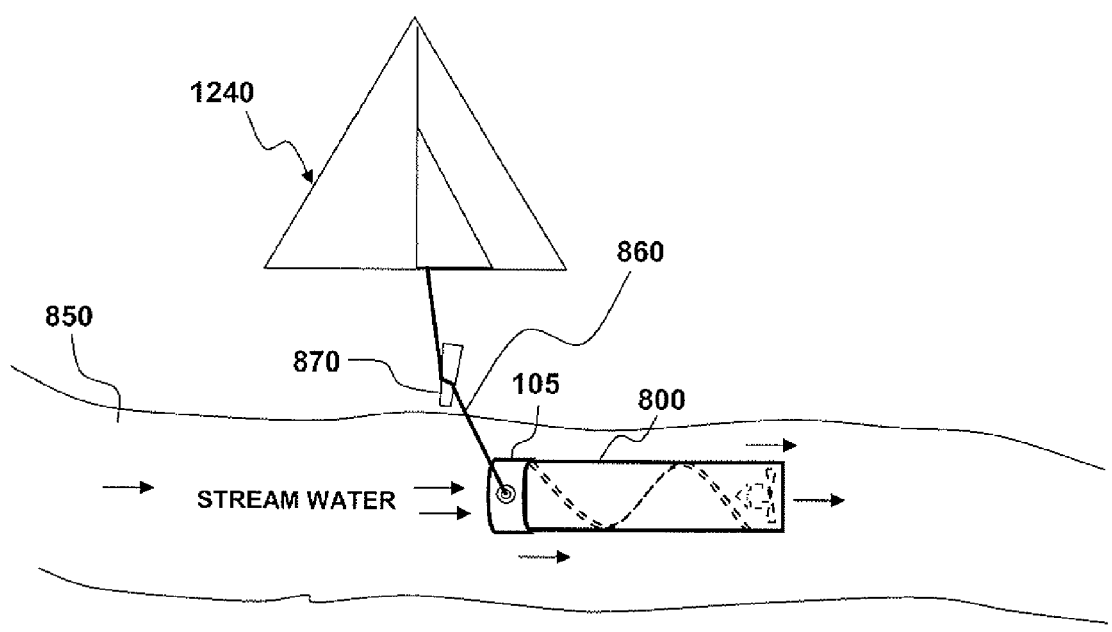
FIG. 14 is a schematic representation of a hydraulic power generation application for the fluid driven electrical power generating system including an electric line and tether, in accordance with features of the present invention.

The system shown in FIG. 13 can be used for field application such as camping, military, humanitarian relief, and other remote electrical power generation needs. Referring to FIG. 14, an example scenario is illustrated wherein an occupant of a camp 1240 inserts a fluid driven electric power generating system 800 within a stream 850 and tethers a line 860 to the ground near the stream with a tether post 870. The line 860 serves a dual purpose of securing the system 800 as well as delivering electrical power generating by the system 800 into the camp 1240. It can be appreciated that the system 800 can be used for fixed residences (e.g., cabins) located near a stream. The system 800 can be scaled in size to accommodate mobile applications (e.g., hiking, camping, military) or residential/commercial needs.

FIG. 15 illustrates a side view for a schematic diagram of a bi-directional fluid driven electrical power generating system 900, which can be placed within the ocean along a coastline for use to generate electrical power, in accordance with features of the present invention. The bi-directional fluid driven electrical power generating system 900 shown in FIG. 15 can enable fluid to flow into the housing in either direction from both ends 901/902. The alternator 945 is shown located in the middle of the tubular housing 910, although it should be appreciated that it can be placed at most any location within the tube. Cowlings 905 located at each end enhance capture of fluid from ocean currents located beneath the ocean's surface. At least one helix 920 located within/on the inner housing surface causes fluid to spiral in either direction flow.

As shown in FIG. 16, the alternator system 940 can include two alternators that can be placed at both sides of a fan blade assembly 930. Each alternator can include a cone 950 installed at the alternator's surface. The alternators and fan blade assembly can be suspended for balanced in line rotation within the housing brackets 940.

As shown in FIG. 17, the alternator system 940 for the present invention can include a slotless integrated fan alternator as described in more detail below in FIGS. 21-23. A slotless integrated fan alternator can be used in unidirectional and bi-directional configurations. Only a single alternator is necessary when used within the bi-directional fluid driven electric power generation system 900 can simplify the system. Only one fan blade assembly 930 with magnets 930 mounted on its perimeter would be required to cause electromagnetic influence on fixed coils 945 integrated with the housing 910 for a bi-directional system. Two cones 950 can be disposed at each side of the fan blade assembly 930 to direct fluid flow through fan blades and create venture pressure. The fan blade assembly can be mounted for balanced rotation within the housing brackets 980. Although other alternators/generators can be used, a slotless integrated fan alternator can be more efficient as the outer circumference of the fan includes magnets that cause electromagnetic energy to be experienced by wiring formed around a core that can be fixed to the housing of the bi-directional system 900 or outside of the tubular housing.

Figure 18:
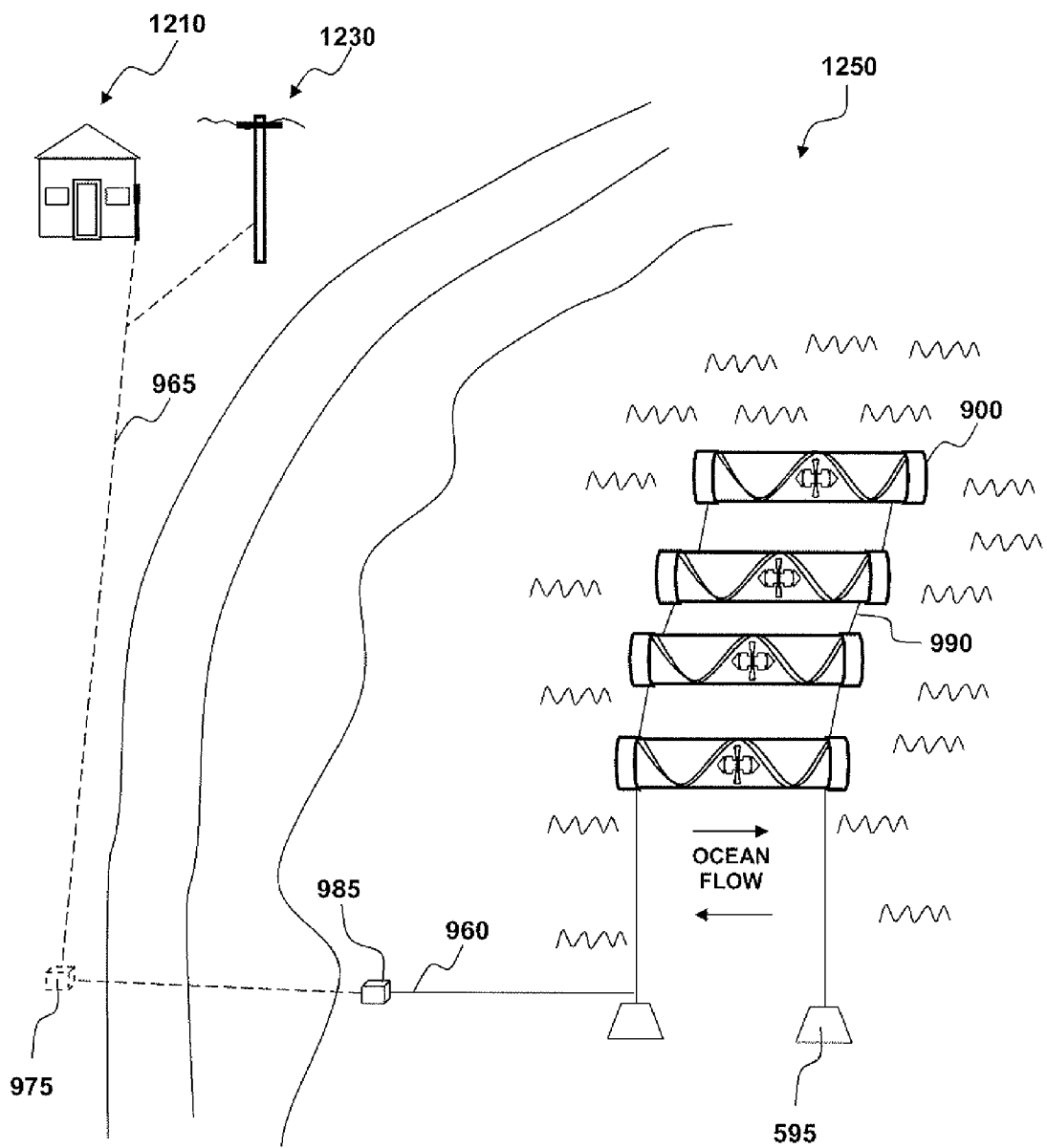
FIG. 18 is a schematic representation of a hydraulic power generation application for the fluid driven electrical power generating system adapted for bi-directional fluid flow wherein several systems can be tethered for use along a shoreline, in accordance with features of the present invention.

The system shown in FIG. 15 can be used for electrical power generation along ocean coastlines. Referring to FIG. 18, an example scenario is illustrated wherein several bi-directional systems 900 are electrically connected to each other 990 and tethered beneath the ocean's surface within optimum ocean flow in and away from the coast by anchors 595. Electrical wiring 960 can be carried to end use 1210/1230 via junction boxes 985 located underwater and underground 975 at shore. It can be appreciated that wiring used to electrically connect the bi-directional systems to each other can also serve as support lines.

Some manufacturers are proposing use of a small electric motor that is squeezed between the engine and transmission, replacing the conventional alternator and starter motor. While waiting at a stop light, the truck's internal combustion engine shuts off, then turns on and takes off smoothly with a slight assist from the electric motor when the driver needs to accelerate. An added bonus: the system provides 110-volt outlets on board for power tools or other uses. Some refer to this system as a "start-stop" hybrid, General Motors calls it a "parallel" hybrid, and the auto industry says this, too, is a mild hybrid.

Vehicles that combine two or more sources of power will typically be referred to as a hybrid vehicle (HV). According to the U.S. Department of Energy, hybrid electric vehicles (HEVs) are vehicles that combine an internal combustion engine (ICE) and a battery with an electric motor. Automobile manufacturers such as Toyota, Honda® and Ford® sell such vehicles. Newer companies are now proposing all electric motor vehicles, such as that proposed by Tesla Motors of San Carlos, Calif.

A parallel system, such as that found in the Ford Escape® Hybrid SUV and Toyota Prius® sedan, can be powered by the gas engine only, the electric motor only, or both at the same time. Honda's two-seat Insight and Honda Civic® sedan incorporate a series-type hybrid, where the electric motor assists the internal combustion engine when needed, such as during acceleration or times of heavy load, but doesn't power the car on its own.

The wind power generator design of the present system lends itself to more efficient power generation for Hybrid or all electric vehicles by incorporating the design of the cowling 105 (a tube with an aerodynamic fairing around it) or conical air intake to help direct air flow encountered at the front of a moving vehicle during the vehicle's forward movement into the electric power generating chamber. The cowling inlet 105 when incorporated into a vehicle is designed to draw in as much wind coming toward it as possible to cause favorable power generation by the system as a result of fixed helix 120 and fan blade assembly 130 interaction with air flow through the tubular 110 at the front grill or in the fairing of a hybrid or all electric vehicle. A moving vehicle would therefore be generating electricity while it is in motion; the electricity charging or storing power with the vehicle's batteries.

Figure 19:
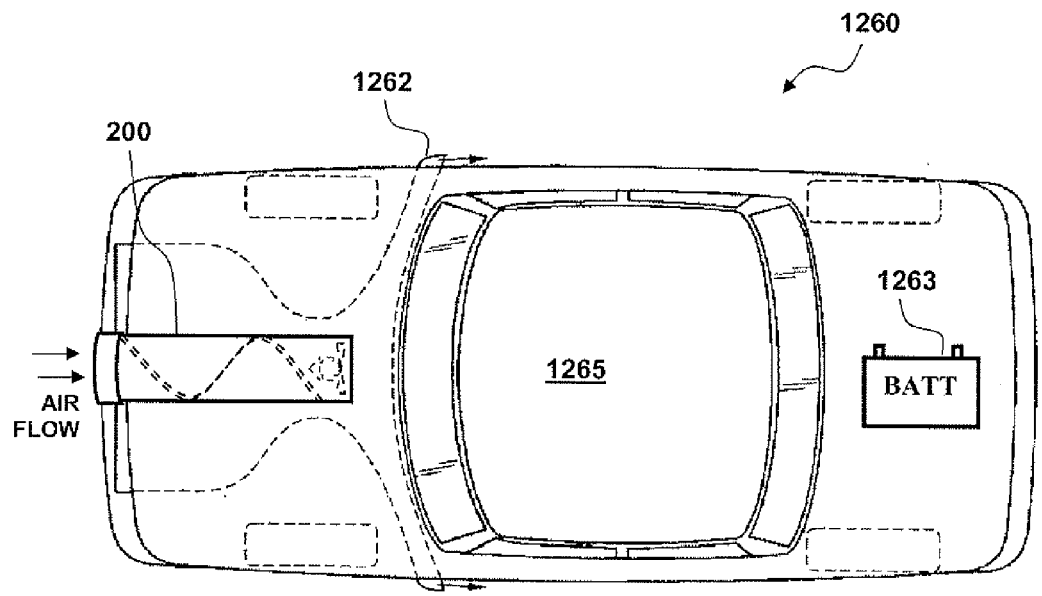
FIG. 19 is a schematic representation of a mobile power generation application for the fluid driven electrical power generating system, in accordance with features of the present invention.

Referring to FIG. 19, a mobile application 1260 is illustrated. An automobile 1265 includes a fluid driven electrical power generator 200 therein for the mobile application. As shown in FIG. 19, a fluid driven electrical power generator 200 can be installed at the front of an electrical or hybrid vehicle 1265 where air flow can be generated when the vehicle 1265 is in forward motion (e.g. along a highway). Air flowing through the system can be exhausted 1262 at various location from the vehicle. Electrical power generated by the system 200 can be used to charge batteries 1263 located in the vehicle.

Other vehicles that can incorporate the electric power generating system of the invention include water vessels, trains, and aircraft. All vehicles encounter some force caused by air at the front of the vehicle, regardless of the vehicle's aerodynamic design. This force is typically viewed as drag on a vehicle's efficiency, and is often used to determine a vehicles drag co-efficient. There is no escaping the phenomena of drag on a moving vehicle, but this drag can now be utilized as a source of energy for the purpose of generating electricity for concurrent or future use by the vehicle.

Figure 20:
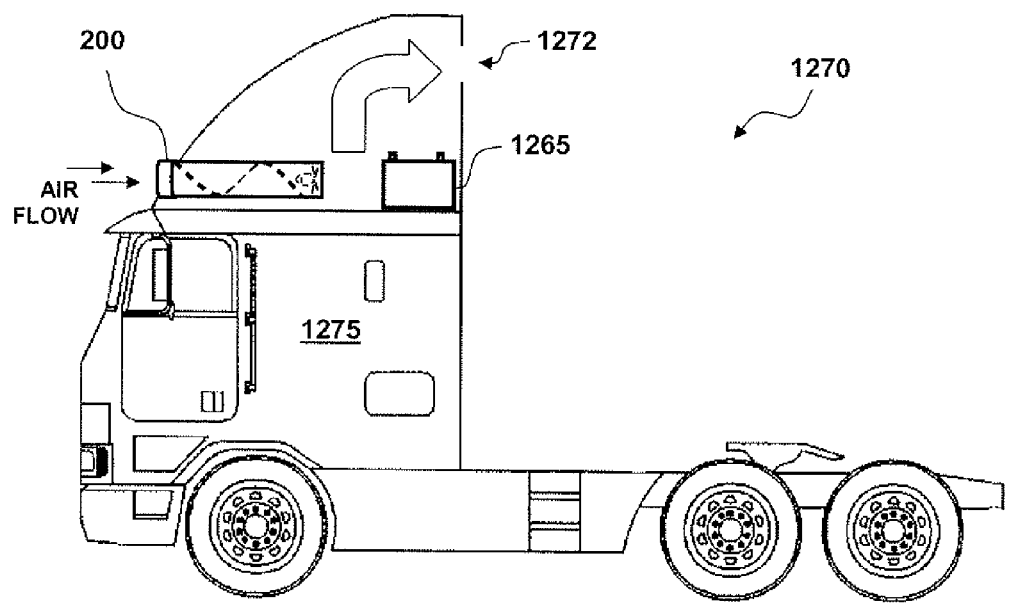
FIG. 20 is a schematic representation of another mobile power generation application for the fluid driven electrical power generating system, in accordance with features of the present invention.

Referring to FIG. 20, another mobile application 1270 is illustrated wherein a side view of a tractor truck 1275 is shown. In this commercial/industrial application, a fluid driven electrical power generator 200 can be installed at the front of the tractor truck wherein air flow can be taken into the system 200 and then exhausted 1272 from the system. Electrical power generated by the system 200 can be used to charge batteries 1265 located on the tractor truck 1275. It can also be appreciated that electrical power can be used real-time to provide power to refrigeration units that might be transported with a trailer being hauled by the tractor truck.

In accordance with a feature of the present invention, a slotless integrated fan alternator 560 can be provided as the electrical power generating hardware for the invention described herein. Referring to FIGS. 21-23, partial views of an exemplary slotless integrated fan alternator 560 in accordance with an embodiment of the present invention are illustrated. The cutaway views of the alternator shown in FIGS. 21 and 22 include conductor coils 80 formed from a flat conductor material (e.g., copper) emplaced around a laminated or other eddy current reducing material, such as powdered iron, providing a low loss core 78, the core can be comprised of a magnetic flux conducting material, such as steel or other ferrous material. The use of a flat conductor material can maximize the compactness in spacing of the coils 80, while minimizing eddy currents and other negative effects associated with use of round cross-sectional conductor material, such as typical round profile copper wire.

The laminated or otherwise low loss core 78 and emplaced conductor coils 80 can be surrounded by a watertight molded section 53, such as a sealed plastic casing. The winding portion of the alternator 32, which includes the laminated or otherwise low loss core 78, the coils 80, and the molded section 53, can be integrated in or located within or outside the tubular housing 110 (not shown). In the embodiment shown in FIGS. 21-23, the winding portion of the alternator 32 can be divided into three sections 52a, 52b, 52c, although any suitable number of sections (including one) may be used. Advantages of the use of such sections 52a, 52b, 52c include increased ease of repair by allowing disassembly and replacement of only a portion of the winding portion of the alternator 32. In addition, emplacement of the coils 80 about the laminated or otherwise low lass core 78 can be simplified, as the cons 80 may be wound separately from the core portions corresponding to the winding portion sections 52a, 52b, 52c, and then slidably or otherwise emplaced about the winding portion sections 52a, 52b, 52c via the ends of the winding portions sections 52a, 52b, 52c. Further, the sections 52a, 52b, 52c may be more easily produced by comprising smaller angle portions of the overall winding portion of the alternator 32. For example, in one embodiment, the laminations and/or other core material are stamped from flat stock, and a greater number of laminations may be most efficiently produced from the flat stock by using one third sections (or smaller) sections of the winding portion of the alternator 32. Likewise, such produced core sections and produced winding portions may more easily by shipped and stored.

The rotating portion of the alternator 96 can include a rotor portion 84 and a magnet portion 82. The rotor portion 84 includes a rim portion 84a, a hub portion 84b, and one or more fan blade shaped spokes 84c for coupling the rim portion 84a to the hub portion 84b. The fan blades 84c are an important aspect of the generator in order to facilitate its use in line within fluid streams passing through a tubular housing. The fan blades can be provided in a cupped formation in order to enhance the capture of fluid, and thereby enhance rotational movement of the rotor portion 82 as fluid passes through the rotor portion 82 and fan blades 84c. The magnet portion 82 includes a plurality of magnetic elements (e.g., individual magnets or magnetized portions of magnetic material) arranged about and attached to the rim portion 84a. For example, the magnetic elements may include a plurality of individual magnets abuttably attached (e.g., such as by an adhesive) to the rim portion 84a, each of the individual magnets being oriented 180 degrees in its polar direction relative to each pair of adjacent individual magnets, such that alternating pairs of adjacent north and south magnet poles are formed, and fields are produced by such magnets, each field having an orientation 180 degrees opposite the field produced by each adjacent magnet. To increase the magnetic flux transmitted via the magnetic elements, such as relative to air, the core 78 typically includes a magnetic flux conducting material, such as iron, steel, or other ferrous material, and the rim portion 84a of the rotor portion 84 also includes a magnetic flux conducting material, such as iron, steel, or other ferrous material. A cone 95 can be provided and if provided can be oriented facing incoming fluid flow within the tubular housing in order to compress and speed up the flow of fluid as it impacts the fan blades 84C. At the backside of the rotor potion 84, opposite the cone 95, an axle and hub assembly (not shown) can be provided to securely orient and mount the rotor portion within the tubular housing 110 and in alignment with the winding portion 32 of the alternator.

A hub associated with the rotor portion 84 can be attached to an axle. The axle can include one or more features such as bearings or bushings, for minimally frictionally engaging a mounting, such as an opening in an alternator housing. In operation, the magnet portion 82 is thus able to rotatably move via the rotor portion 84 and the driven axle 95 relative to the fixably maintained winding portion as fluid passes over and through the fan blades 84C. In wet applications, it may be preferable that the hub, bearing and bushings section of the rotor be sealed.

Figure 21:
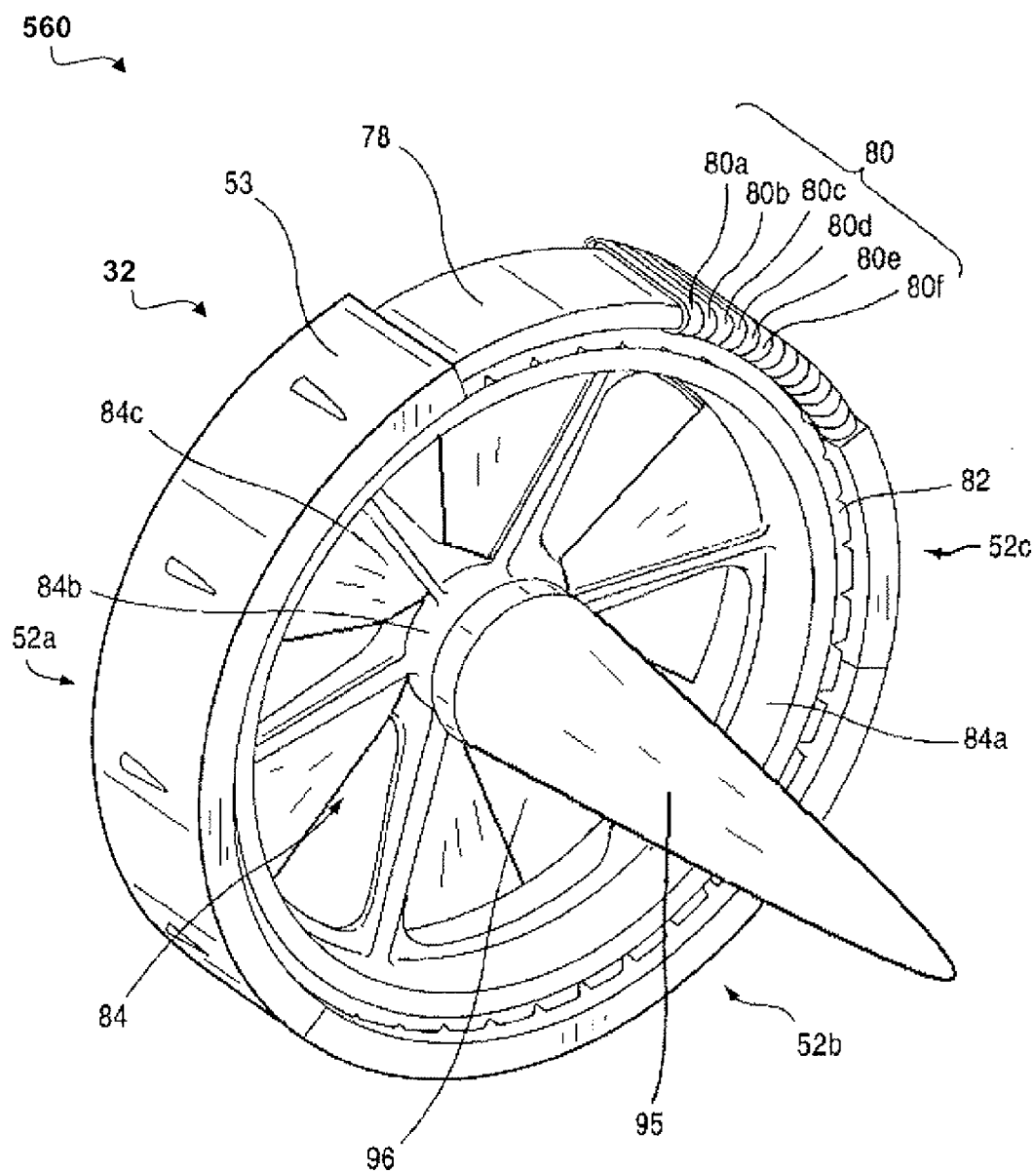
FIGS. 21-23 is a perspective view of a slotless integrated fan alternator wherein the outer circumference of the fan includes magnets that cause electromagnetic energy to be experienced by wiring formed in a core form on/outside of the tubular housing, in accordance with features of the present invention.
Figure 22:
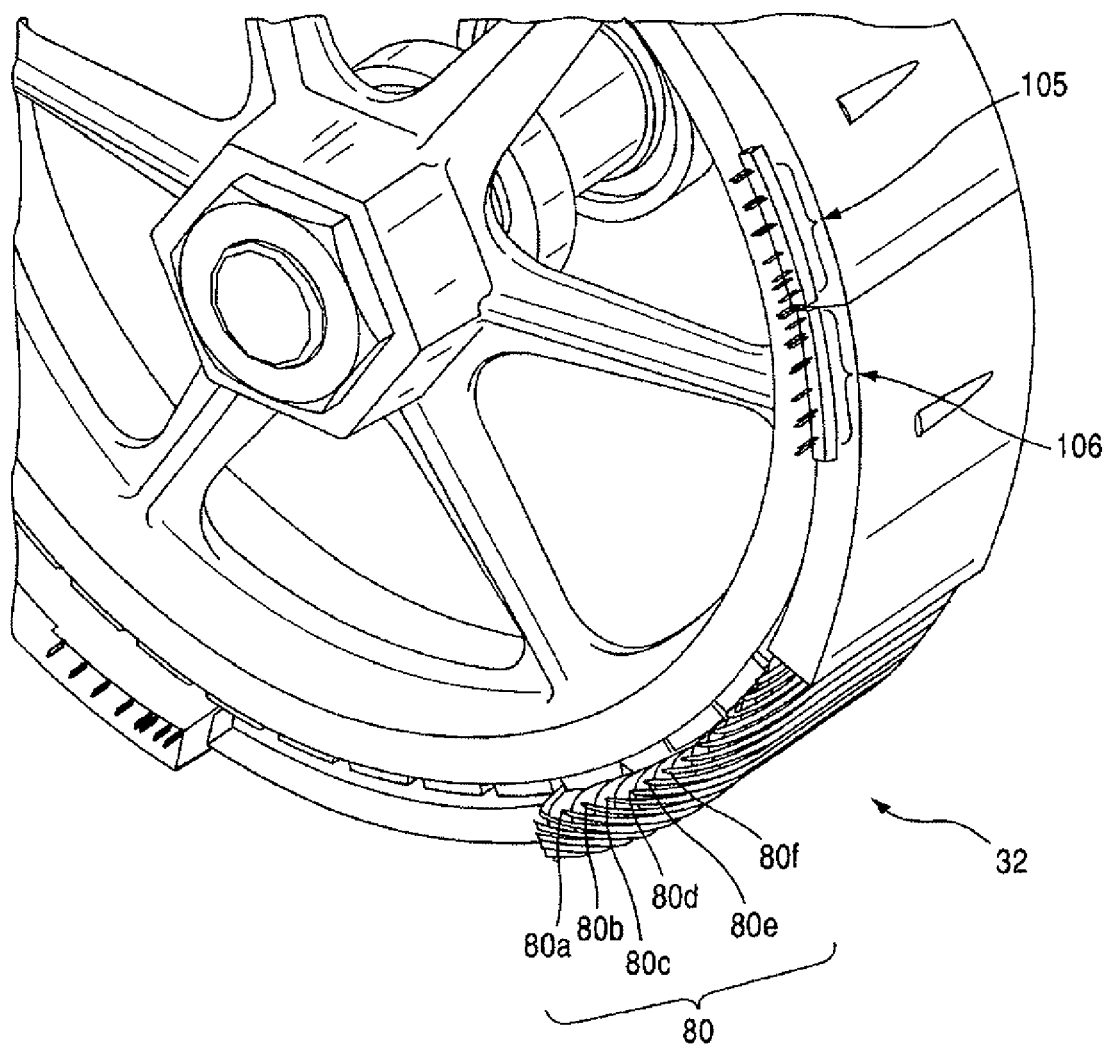

The coils 80 of the exemplary embodiment shown in FIGS. 21 and 22 are connected so as to form six sets of windings 81a, 81b, 81c, 81d, 81e, 81f, which abut one another and repeat in sequence about the circumference of the laminated or otherwise low loss core 78. As shown most clearly in FIG. 117, each of the sets of windings 81a, 81b, 81c, 81d, 81e, 81f can be connected to the next corresponding set of windings along the windings portion of the alternator 32 at one end. In one embodiment, successive pairs of each of the sets of windings are connected at opposite ends, such that the each successive coil portion has opposite polarity to the previous connected coil portion. Among other advantages, this approach allows multiple connections and increased redundancy to be obtained, thereby providing the necessary redundancy for the redundant stall control. Assembly may be eased and performance may be improved by ensuring that each of the sets of windings 81a, 81b, 81c, 81d, 81e, 81f are very similar or essentially identical.

Figure 23:
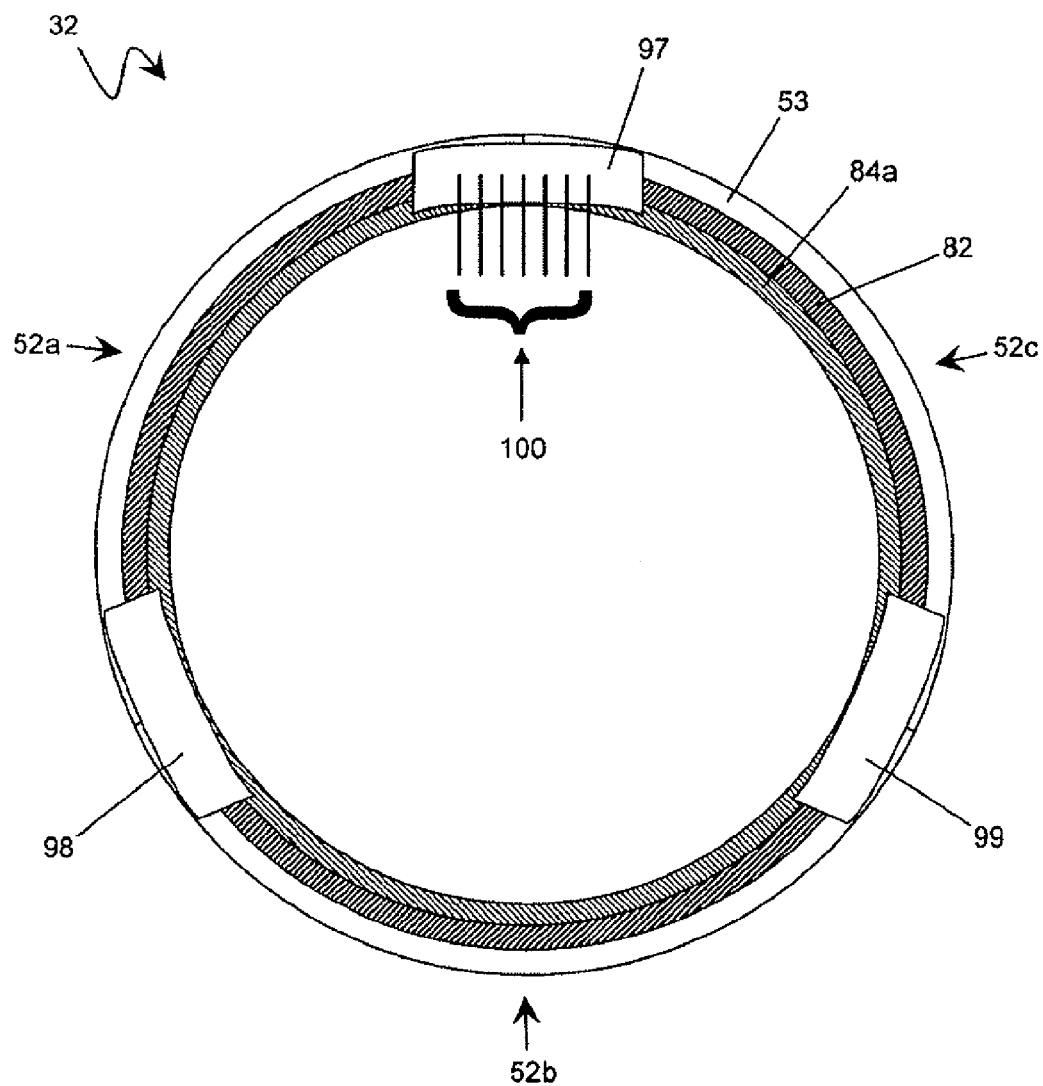

FIG. 23 shows a partial diagram of the alternator 32, which includes the windings portion 53, the magnet section 82, and the rim 84a of the hub. Upon assembly, each of the three winding portion sections 52a, 52b, 52c of the alternator 32 can be connected at its ends to the adjacent two sections. Six wire ends (see, e.g., wiring end groups 105, 106, as shown in FIG. 22), one for each of the six sets of windings 80a, 80b, 80c, 80d, 80e, 80f, as shown in FIGS. 21 and 22, extend from each end of each of the three winding portion sections 53a, 53b, and 53c. Each of the six wire ends extending from each abutting pair of winding portion sections 53a, 53b, 53c can be coupled to the six wire ends extending from the adjacent winding portion section. The coupling may occur, for example, via printed circuit boards or other coupling components 97, 98, 99. Each of the laminated or otherwise low loss cores 78 of each of the winding portion sections 52a, 52b, 52c similarly abut one another.

Six continuous windings can be therefore formed by the coupled corresponding windings in each of the winding portion sections 53a, 53b, 53c, shown in FIGS. 21-23, with a first end of each of the six continuous windings terminating at one of the coupling components 97, which includes a lead corresponding to each of the first ends of the six continuous windings.

Each of the second ends of the six continuous windings are coupled together via the coupling component 97 and coupled to a seventh lead, such that seven leads 100 extend from the coupling component 97, the seventh lead corresponding to the center point of the six continuous windings. Alternators generate electricity by the same principle as DC generators, namely, when the magnetic field around a conductor changes, a current is induced in the conductor. Typically, a rotating magnet called the rotor turns within a stationary set of conductors wound in coils on an iron core, called the stator. The field cuts across the conductors, generating an electrical current, as the mechanical input causes the rotor to turn. The rotor magnetic field can be produced by induction (in a "brushless" alternator), by permanent magnets (in very small machines), or by a rotor winding energized with direct current through slip rings and brushes. The rotor magnetic field may even be provided by a stationary field winding, with moving poles in the rotor.

Figure 24:
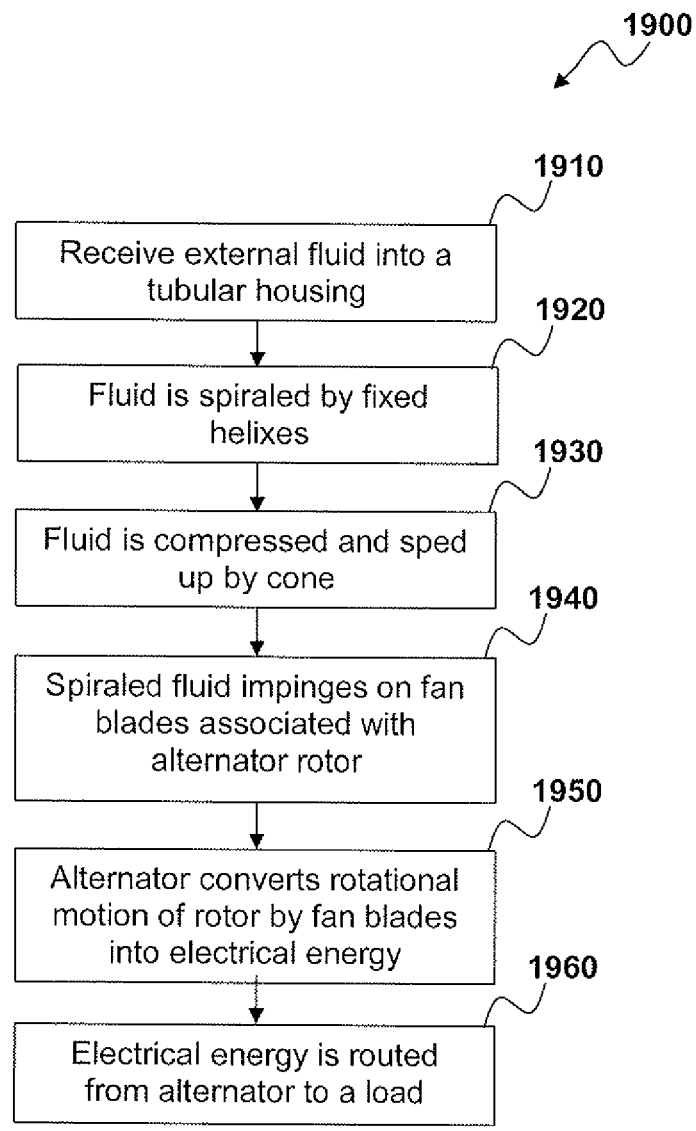
FIG. 24 illustrates a high level flow chart of operations depicting a fluid driven electrical power generating method, which can be implemented in accordance with a preferred embodiment.

FIG. 24 illustrates a high level flow chart 1900 of a fluid driven electrical power generation method, which can be implemented in accordance with a preferred embodiment. External fluid can be received into a tubular as shown in Block 1910. As depicted at Block 1920, fluid within the housing becomes spiraled by fixed helixes, formed on the inner surface of the tubular housing. The spiraled fluid flow can be then compressed and speeds up by a cone as shown in Block 1930. Then as shown in Block 1940, spiraled fluid impinges on fan blades associated with an alternator rotor. Then as shown in Block 1950, an alternator converts rotational motion of the rotor by fan blades into electrical energy. Then as shown in block 1960, electrical energy can be routed from the alternator to a load.

Figure 25:
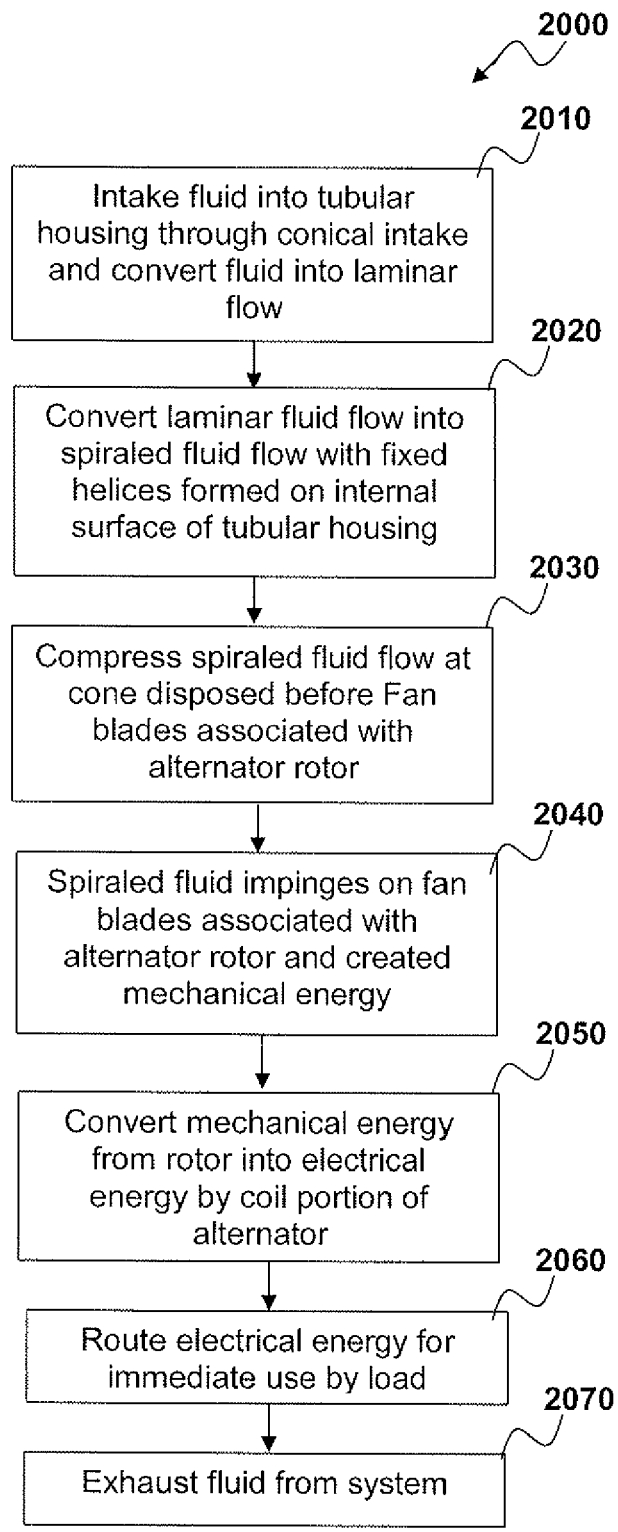
FIG. 25 illustrates a high level flow chart of operations depicting a fluid driven electrical power generating method, which can be implemented in accordance with an alternative embodiment.

FIG. 25 illustrates a high level flow chart 2000 of a fluid driven electrical power generation method, which can be implemented in accordance with a preferred embodiment. As shown in Block 2010, fluid flow can be taken into a tubular housing through a conical intake and then converted into a laminar flow. Then as shown at Block 2020, laminar fluid flow can be converted into spiraled fluid flow with fixed helices formed on the internal surface of the tubular housing. Then as shown in block 2030, spiraled fluid flow can be compressed with a cone disposed before fan blades associated with the alternator rotor. The spiraled fluid impinges on the fan blades associated with alternator rotor and creates mechanical energy as shown in block 2040. The mechanical energy can be then converted from the fan rotor into electrical energy by a coil portion of the alternator, as shown in Block 2050. Then as shown in Block 2060, electrical energy can be routed for immediate use by a load. Finally, as shown in block 2070, fluid can be exhausted from the system.

The wind driven electric power generator of the present invention can be compact and easy to mount. The present system can be designed for harsh climates, built simply and ruggedly to quietly last. The system design can incorporate a cowling as an air intake and internal helical vanes to help direct the amount of air flow into the chamber to capture more wind and produce more energy, especially in low wind speeds which lends itself to more efficient power generation utilizing renewable energy. Various system configurations can be achieved given the present teaching by incorporating the most advanced technology in the industry and providing highly reliable power systems that can integrate state-of-the-art off the shelf micro-processor regulator for more accurate charging, more power, lower startup speed and quieter operation, and small wind turbine generators. For example, a light weight system can be manufactured using an Aluminum cast body and carbon matrix rotor blades. A system can be designed to start up a low wind speed (e.g., starting at 7 mph), run efficiently (e.g., 100 watts at 18 mph, 200 watts at 22 mph, 400 watts at 28), and be resilient to harsh conditions (e.g., designed to govern in high winds and auto-brake one demand or automatically).

Generated electrical power can be routed via electrical connections from the generator for direct storage in and then for later from batteries, Conditioning can be provided to generated power if necessary using conditioning circuits known in the art (e.g., filtering circuits). The size of the present system is scalable to meet delivery requirements.

Temperature of the system may need to be controlled depending on the climate it operates within. For example, during winter or in colder climates, an internal thermostatically controlled heating device may be incorporated into the system to prevent freezing of the unit's moving parts.

The enclosure tube (i.e., the general housing) can be designed such that its diameter can be calculated to fit the desired electrical output and must be matched with each integral part both internal as well as external. This calculation can also include allowance for creation of a pressure effect between and/or over the generator and its mounting assembly to maximize the affect of the available wind. The enclosure can be made of a tough light weight metal or a composite that will be able to withstand harsh environments while meeting the highest of standards.

Additional features of the system are that the generator can be placed substantially within the housing, which can protect it from external elements, and the fan can be connected to the generator at the end of the system opposite incoming wind with respect to the generator and tubing. A cone can be located at the front of the generator facing incoming air/wind to cause the wind/air to flow directly onto the blades and not encounter a flat edge typically associated with the back of a generator. Pressure caused between the tubing and the cone/generator can be forced onto the generator fan blade assembly and outward where it exits to the rear of the unit. The back of the generator can be fitted with a cone as well to further direct the air on to the cupped fan blade. The rear funnel also plays a critical part as the blade can be placed in such a way to provide additional thrust to the fan blade by the clearance of the blade and funnel.

An electronic starting circuit can be provided in order to facilitate initial starting of the generator from periods when the generator is idle (e.g., no rotation due to lack of wind). The electronic starting system can provide an initial release of electrical energy to the windings in the generator to thereby reduce the amount of wind required to spin-up or start rotation of the generator. For example, a capacitor circuit has been coupled into electrical systems such as heating and air conditioning units to provide initial startup. Generators are known to have some resistance under a load. With a large initial starting charge drawn from the circuit, the generator can be spun up to a speed where at the wind can take over and continue rotation of the generator at minimum speeds via the fan blades.

It should also be appreciated that a various alternators can be used as the generator for the present invention. Prior art alternators/generators typically contain slots of steel that hold a number of copper windings, which, in connection with the use of permanent magnets, convert the energy of a passing fluid into electrical output. In the prior art designs, the slots often tend to vibrate when in operation. The vibration can produce unacceptable noise and a cogging torque that prevents the fluid turbine from starting up or interferes with startup in lower fluid speeds, which typically experienced by wind turbines. Additionally, prior art alternators typically have low stall torque and high manufacturing costs. A new alternator design is needed that eliminates unnecessary vibrations, increases the stall torque, and decreases manufacturing costs.

It should be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A fluid driven electrical power generating system, comprising:
   a tubular housing having an inner surface, outer surface, a first end and a second end, the first end including a cowling adapted to capture fluid and directing it into the tubular housing, and the second end forming an exhaust for fluid to exit the tubular housing;
   at least one fixed helical vane formed in a spiral on the inner surface of the tubular housing;
   an alternator further comprising a slotless winding portion including windings encompassing a core comprising magnetic flux conducting material; a fan rotor portion having a rim formed on the outer diameter of integrated fan blades, and a plurality of magnetic elements attached to the rim, wherein the rim comprises a magnetic flux conducting material and wherein the slotless winding portion is fixed to the tubular housing and the fan rotor portion is rotatably moveable relative to the slotless winding portion as a fluid passes through the tubular housing and said fan rotor; and
   a generator cone mounted at a front surface of the fan rotor portion facing fluid as the fluid passes through the tubular housing;
   wherein the cowling captures fluid and directs it into a tubular housing, the at least one fixed helical vane further directs the captured fluid into a spiraled air flow that passes over the generator cone and is compression between the generator cone and housing resulting in increased pressure and velocity of the spiraled fluid flow onto the fan rotor thereby increasing rotational speed of the fan blades as compressed fluid passes through the fan rotor and exits the tubular housing.

2. The fluid driven electrical power generating system of claim 1, further comprising:
   a pole adapted to rotatably mount the tubular housing thereto; and
   a fin mounted to the outer surface of the housing near the second end of the housing, the fin adapted for orienting the first end of the housing and the cowling into wind.

3. The fluid driven electrical power generating system of claim 1, wherein the system can he integrated near the front of a moving vehicle to capture air flow with the cowling as the vehicle moves forward and enable air to pass through the housing and helical vanes, between the generator cone and inner housing surface onto the fan blades thereby spinning the electrical generator and generating electrical power from air flow for use by a load in the moving vehicle.

4. The fluid driven electrical power generating system of claim 1, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind.

5. A fluid driven electrical power generating system comprising an alternator including a slotless winding portion with windings encompassing a core of magnetic flux conducting material said slotless winding portion integrated with a tubular housing having an inner surface, outer surface, a first end and a second end, the first end receiving fluid and directing it toward the alternator and the second end carrying fluid away from the alternator, and a fan rotor portion having a rim formed on the outer diameter of integrated fan blades, and a plurality of magnetic elements attached to the rim, wherein the rim comprises a magnetic flux conducting material and the fan rotor portion is rotatably moveable relative to the slotless winding portion as a fluid passes through the tubular housing and through said fan rotor, wherein fluid flowing through the tubular housing and through the fan rotor causes rotational movement of the fan blades and magnetic flux conducting material and causes electricity generation by the alternator as fluid passes through the fan rotor and passes through the tubular housing.

6. The fluid driven electrical power generating system of claim 5, further comprising at least one fixed helical vane formed in a spiral on the inner surface of the tubular housing where fluid approaches the alternator, said fixed helical vane causing rotation of fluid on the fan blades and increases rotational speed of the fan blades as fluid passes through the fan blades and passes the alternator within said tubular housing.

7. The fluid driven electrical power generating system of claim 5, further comprising a cone mounted in front of the fan blades and facing fluid passing through the tubular housing and the fan blades, wherein as fluid passes over the cone it is compressed between the cone and housing resulting in increased pressure and velocity of the fluid as the fluid passes through the fan blades, thereby increasing rotational speed of the fan blades and alternator as compressed fluid passes through the fan blades and passes the alternator within said tubular housing.

8. The fluid driven electrical power generating system of claim 5, further comprising at least one fixed helical vane formed in a spiral on the inner surface of the tubular housing where fluid approaches the alternator and a cone mounted in front of the fan blades and facing fluid passing through the tubular housing and the fan blades, said fixed helical vane causing increased rotational speed of the fan blades as fluid passes through the fan blades and passes the alternator within said tubular housing and said cone causing increased pressure and velocity of the fluid on the fan blades as the fluid is compressed when it passes between the cone and housing before reaching the fan blades.

9. The fluid driven electrical power generating system of claim 5, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind.

10. The fluid driven electrical power generating system of claim 6, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind.

11. The fluid driven electrical power generating system of claim 7, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind, 12. The fluid driven electrical power generating system of claim 8, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind.

13. The fluid driven electrical power generating system of claim 5, further comprising a cowling located at the first end and adapted to capture fluid and direct it into a tubular housing.

14. The fluid driven electrical power generating system of claim 13, wherein the system can be integrated near the front of a moving vehicle to capture air flow with the cowling as the vehicle moves forward and enable air to pass through the housing and helical vanes, between the generator cone and inner housing surface onto the fan blades thereby spinning the electrical generator and generating electrical power from air flow for use by a load in the moving vehicle.

15. The fluid driven electrical power generating system of claim 13, further comprising:
　a pole adapted to rotatably mount the tubular housing thereto; and
　a fin mounted to the outer surface of the housing near the second end of the housing, the fin adapted for orienting the first end of the housing and the cowling into wind.

16. The fluid driven electrical power generating system of claim 13, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind.

17. A fluid driven electrical power generating system comprising:
　an alternator including a slotless winding portion with windings encompassing a core of magnetic flux conducting material said slotless winding portion integrated with a tubular housing having an inner surface, outer surface, a first end and a second end, the first end receiving fluid and directing it toward the alternator and the second end carrying fluid away from the alternator, and a fan rotor portion having a rim formed on the outer diameter of integrated fan blades, and a plurality of magnetic elements attached to the rim, wherein the rim comprises a magnetic flux conducting material and the fan rotor portion is rotatably moveable relative to the slotless winding portion as a fluid passes through the tubular housing and through said fan rotor;
　at least one fixed helical vane formed in a spiral on the inner surface of the tubular housing where fluid approaches the alternator, said fixed helical vane causing increased rotational speed of the fan rotor portion as fluid passes through and rotates the fan blades within said tubular housing; and
　a cone mounted in front of a hub at a center of the fan rotor assembly facing fluid passing through the tubular housing towards the fan blades, said cone causing increased pressure and velocity of the fluid on the fan blades as the fluid is compressed when it passes between the cone and housing before reaching the fan blades;
　wherein fluid flowing through the tubular housing and through the fan rotor portion causes rotational movement of the fan blades and causes electricity generation by the alternator as fluid passes through the fan rotor portion within the tubular housing.

18. The fluid driven electrical power generating system of claim 17, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind.

19. The fluid driven electrical power generating system of claim 18, further comprising a cowling located at the first end and adapted to capture fluid and direct it into a tubular housing.

20. The fluid driven electrical power generating system of claim 19, wherein the system can be integrated near the front of a moving vehicle to capture air flow with the cowling as the vehicle moves forward and enable air to pass through the housing and helical vanes, between the generator cone and inner housing surface onto the fan blades thereby spinning the electrical generator and generating electrical power from air flow for use by a load in the moving vehicle.

21. The fluid driven electrical power generating system of claim 19, further comprising:
- a pole adapted to rotatably mount the tubular housing thereto; and
- a fin mounted to the outer surface of the housing near the second end of the housing, the fin adapted for orienting the first end of the housing and the cowling into wind.

22. The fluid driven electrical power generating system of claim 19, wherein said fluid driven electrical power generating system is incorporated to generate electrical power for a load in at least one of: in the front of a mobile vehicle, at the front of a marine vessel, in a stream, in a river, under an ocean surface along a coastline, mounted above ground on a pole to capture wind, mounted on a building to capture wind.

\* \* \* \* \*